M. BONORA.
PRIMARY BATTERY.
APPLICATION FILED JAN. 31, 1917.

1,269,679.

Patented June 18, 1918.
2 SHEETS—SHEET 1.

Inventor
Menotti Bonora,
By Henry Orth Jr
Atty.

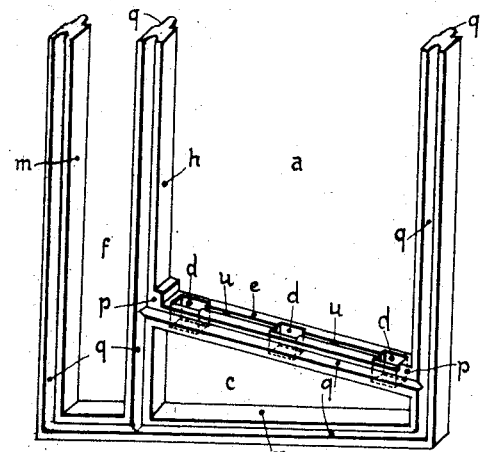

UNITED STATES PATENT OFFICE.

MENOTTI BONORA, OF TURIN, ITALY.

PRIMARY BATTERY.

1,269,679.        Specification of Letters Patent.        Patented June 18, 1918.

Application filed January 31, 1917. Serial No. 145,785.

*To all whom it may concern:*

Be it known that I, MENOTTI BONORA, a subject of the King of Italy, residing at Turin, in the Kingdom of Italy, have invented certain new and useful Improvements in Primary Batteries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide an electric battery for the direct generation of electricity. The battery is so arranged that it takes the smallest possible space and may be easily transported, so that it may in many cases be used in the place of the portable storage batteries now in use which must be brought to a generating station for being charged. This battery may also be advantageously used as a stationary battery when currents are needed in places distant from the generating station and deprived of connection therewith.

The object of this invention is illustrated in the annexed drawings, in which:

Figs. 4 and 5 are perspective views of the frames holding the Zn and Cu plates of a modified form of the battery.

Fig. 6 is a partial horizontal section thereof.

Fig. 7 is a vertical section on line C.C of Fig. 8 and Fig. 8 is a partial horizontal section of a further modified form.

Figure 1:
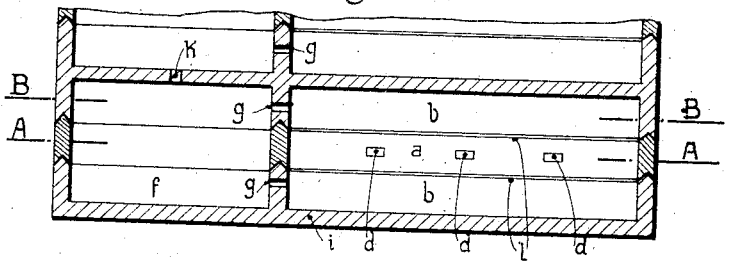
Figure 1 is a horizontal section of the battery, one cell only being shown.
Figure 2:
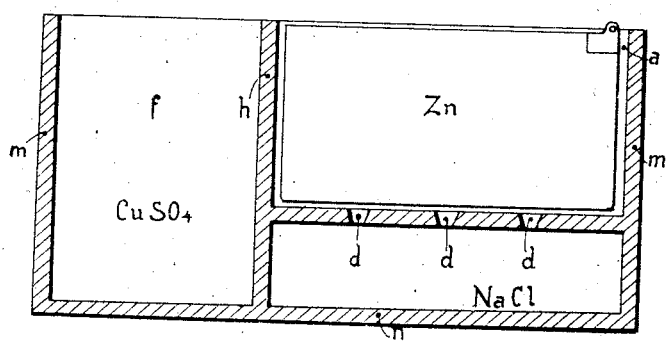
Figs. 2 and 3 are vertical sections on lines A.A and B.B respectively of Fig. 1.
Figure 3:
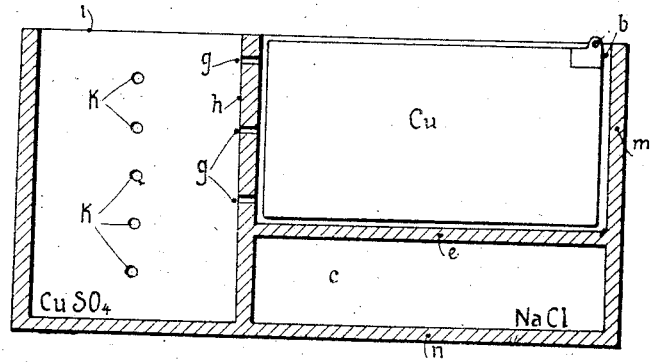

As it appears from Fig. 1, each battery cell comprises three compartments, the central one of which —$a$— contains the zinc while the two lateral ones —$b$— contain the copper, both these metals consist of a flat sheet Zn, Cu, see Figs. 2 and 3.

The zinc plate is immersed in a solution of sodium chlorid contained in a lower compartment —$c$— which solution passes through holes —$d$— provided in the partition —$e$— separating the compartment —$a$—from the compartment —$c$—.

The copper plates are contained in the lateral compartments —$b$— where they are immersed in a solution of copper sulfate, contained in the lateral compartment —$f$— from which the solution passes into the compartments —$b$— through holes —$g$— provided in the vertical partition —$h$—.

In order to obtain an even distribution of the solution in all the cells, the compartments —$f$— communicate with each other through holes —$k$— provided in the partition —$i$—.

The bottom —$e$— of the compartments —$b$—, in which the copper plates are immersed, is not perforated and therefore the said compartments are not connected with the lower compartment —$c$— containing the solution of sodium chlorid which extends under the three compartments —$b.a.c$— but is connected only with the central one —$a$—.

The compartment —$a$— is separated from the two lateral compartments —$b.b$— by means of porous or half-permeable partitions —$l.l$— of suitable material.

For the sake of convenience in the construction and in order to be able to vary the battery power according to circumstances, the battery framework is not in a single piece, but is constituted by a number of cells or frames which are afterward connected together.

The intermediate frames are all alike, only the two end frames being of a different construction.

The frames of the zinc plates, which are all intermediate and therefore all alike, are perforated and, as it appears from Fig. 2 (and Fig. 4 with regard to the modified form) they comprise a rib —$e$— forming the bottom of the compartment —$c$—, a rib —$n$— forming the bottom of the compartment —$c$—, a vertical rib —$h$— acting as a partition between the compartments —$a$— and —$f$— and the two vertical outer walls —$m$—.

The frames for the copper plates are double, viz. they serve, as it appears from Fig. 1 (and Fig. 5 in connection with the modified form) for two copper plates of two adjacent cells and therefore, besides the parts mentioned with regard to the frames of the zinc plates, they comprise the partition —$i$—, on both faces of which all the ribs stand out in relief. The partition —$i$—, the ribs —$h$— and —$e$— are perforated, as above described.

The end frames for the copper plates are single, namely the partition —$i$— that forms the outer wall carries the ribs in relief only on one side.

In order to effect a tight joint between the frames, strips of suitable material may be inserted in the gaps.

In the modified form shown in Figs. 4 to 6, the frame for the Zn plates (Fig. 4) has its rib $e$ inclined in order to allow the solid particles of $ZnSO_4$ to slide and effect the continuous discharge of same in the lower compartment $c$ through the holes $d$. In this way, said particles of $ZnSO_4$ are prevented from stopping under the Zn plates, with which they would come in contact thereby producing an inner resistance (or fall of pressure) or the polarization. For the purpose of further avoiding said inconveniences, projections $p$ of insulating material are provided which act as stops for the Zn plate in order to prevent this latter from getting nearer the rib $e$ than is necessary, and a groove $u$ is also provided in which all the solid particles of $ZnSO_4$ collect and slide along the rib $e$ and fall through the holes $d$ into the compartment $c$.

The frame for the Cu plates of Fig. 5, which being an intermediate one, carries in relief on both faces of the partition —$i$— the ribs —$m.h.e$. It also has rib —$e$— inclined in order to cause it to correspond, when forming the battery, with the corresponding rib of the frame for the Zn plates; the connection between the compartments —$f$— and —$b$— is here formed through the slots —$g$—, which latter when forming the battery are closed in front by the rib —$h$— of the frame of the Zn plate assuming thus the form of holes. Each frame is provided, as in the constructional form above described, alternately with corrugations and grooves —$q$— that engage with corresponding grooves and corrugations —$q$— of the adjacent frame; a suitable packing material being interposed to insure a tight fitting.

In the end frames are provided holes —$r$— and —$s$— communicating with the compartments —$f$— and —$c$— respectively; in said holes are fitted suitable taps for the discharge of the battery and also for cleaning this latter.

In the modified form shown in Figs. 7 and 8, the Cu and Zn frames are provided with a partition —$t$—, separating the corresponding compartments —$b$— and —$a$— in two parts; two Cu (or Zn) plates are therefore used in each of these frames, thus obtaining a current of higher voltage. Evidently in the frames for the Cu plates, the partition —$t$— must be provided with holes in order to allow the solution of $CuSO_4$ to reach the two parts of the compartment —$b$— divided by the said partition.

When two Zn plates and one Cu plate are used for each battery cell, the frames shown in Fig. 5 must be provided with holes connecting the compartments —$b$— and —$c$—, the slots —$g$— will be dispensed with, and the frames of Fig. 4 will be provided with slots or holes connecting the compartments —$a$— and —$f$— while the holes —$d$— will be dispensed with.

Evidently the frames of Fig. 4 as well as the frames of Fig. 5 could be provided with the two series of holes —$d$— and slots —$g$—; in this case in each frame either the holes or the slots will be closed by means of a suitable plaster according to whether the plates Zn or Cu are to be lodged therein. In this case all the frames ought to be provided with the stops —$p$—.

When the battery must be transported, it is provided with a tight closing cover through which the conductors coming from the two poles are caused to pass; the electrode plates may be connected in series or in parallel according to circumstances.

Claims:

1. In a primary battery cell, an intermediate frame member without lateral walls, and end frame members having lateral walls, each frame member having an electrode compartment and a portion of two electrolyte compartments, each electrode compartment having communication with an electrolyte compartment.

2. In a primary battery cell, an intermediate frame member without lateral walls, and end frame members having lateral walls, each member having a substantially vertical partition and a transversely directed partition between said vertical partition and one of its ends above the bottom, said members adapted to be fitted together thereby forming three electrode compartments and two electrolyte compartments, and each electrode compartment having communication with an electrolyte compartment.

3. In a primary battery cell, an intermediate frame member without lateral walls and having a vertical partition, and an inclined transversely directed partition above its bottom and openings in said transversely directed partition, frames having side walls and like vertical and inclined partitions to register with the partitions of the intermediate member, the vertical partitions of said end members having openings therethrough, and diaphragms included between the frames and separating the electrode compartments of the cell.

4. In a primary battery cell, an intermediate frame without sides, and two frames having sides constructed to register with opposite sides of said intermediate frame, and diaphragms included between the frames forming three electrode compartments of the cell.

5. In a primary battery cell, an intermediate frame member without sides having a vertical partition and a transversely directed inclined partition above its bottom and extending from said vertical partition to one of its ends, said inclined partition having openings therethrough and a groove in its upper face connecting said openings.

6. In a primary battery cell, three adjacent frames, each frame having a vertical partition and a transverse partition above its bottom extending from said vertical partition to the ends of the frames thereby forming an electrolyte compartment at one end common to all the frames, a second electrolyte compartment common to all the frames beneath the transverse partition and an electrode space above said transverse partition, diaphragms between the frames separating the electrode space into separate electrode compartments, the transverse partition of the middle frame having openings therethrough to the second electrolyte compartment beneath the transverse partition and the vertical partitions of the other frames having openings therethrough to the first electrolyte compartment.

In testimony that I claim the foregoing as my invention, I have signed my name in presence of two subscribing witnesses.

MENOTTI BONORA.

Witnesses:
FERRUCCIO JECOHECCI LYEGUERE,
NORAH WHITESTONE.

Copies of this patent may be obtained for five cents each, by addressing the "Commissioner of Patents, Washington, D. C."